3,260,675
Patented July 12, 1966

3,260,675
CALCIUM AND MAGNESIUM SILICATE PHOSPHORS WITH ACTIVATOR COMPRISING TERBIUM
William A. McAllister, Morristown, N.J., assignor to Westinghouse Electric Corporation, East Pittsburgh, Pa., a corporation of Pennsylvania
No Drawing. Filed July 1, 1964, Ser. No. 379,776
10 Claims. (Cl. 252—301.4)

This application is a continuation-in-part of application erial No. 249,348, filed January 4, 1963, now abandoned, and owned by the present assignee.

This invention relates to phosphor material and, more particularly, to phosphor material which has good temperature-dependence characteristics and a fluorescence which can be varied in color by varying the activators and activator concentrations.

Most so-called photoluminescent phosphor materials fluoresce efficiently at room temperature to convert ultraviolet radiations into visible radiations. At relatively high temperatures, however, the fluorescent efficiency of most phosphor materials drops off rapidly. A few phosphors operate efficiently at relatively high temperatures and are used extensively in conjunction with high-pressure, mercury-vapor lamps. Such phosphors are known as having "good temperature-dependence characteristics." One class of such phosphors is described in U.S. Patent No. 2,748,303, dated May 29, 1956, to Thorington. Another class of such phosphors is described in U.S. Patent No. 3,025,423, dated March 13, 1962, to Rimbach. It is desirable to provide other phosphors which will efficiently convert ultraviolet radiations to visible radiations. It is also desirable to provide phosphor material which has good temperature-dependence characteristics.

It is the general object of this invention to provide novel phosphor material which efficiently converts ultraviolet radiations into visible radiations, in order to produce varying fluorescent colors.

It is another object to provide novel phosphor material which has good temperature-dependence characteristics.

It is a further object to provide novel phosphor material which has good temperature-dependence characteristics and a fluorescence output in the longer wavelength regions of the visible spectrum.

The aforesaid objects of the invention, and other objects which will become apparent as the description proceeds, are achieved by providing a silicate phosphor which comprises a magnesium, calcium, or calcium-magnesium silicate activated by the rare earth metal terbium. For best performance it is desirable to include an additional lithium or lithium plus manganese activator.

The phosphor of the present invention has for its matrix or host crystal magnesium silicate ($Mg_2SiO_4$), calcium silicate ($Ca_2SiO_4$), or calcium-magnesium silicate, with magnesium silicate being preferred. This host crystal is activated by terbium, terbium plus lithium, or terbium plus lithium plus manganese. The phosphor can thus be described as a silicate phosphor which has the general formulation $X_2SiO_4$:Z. In this formulation, X is at least one matrix constituent material of the group consisting of calcium and magnesium, and Z is one activator material of the foregoing listed group.

As a specific example for preparing the present phosphor, two moles of magnesium carbonate are mixed with one mole of silica, 0.03 mole terbium oxide ($Tb_4O_7$) and 0.07 mole lithium carbonate. The foregoing constituents are thoroughly mixed and are preferably fired either in a nitrogen atmosphere or in a nitrogen atmosphere which contains two percent by volume of hydrogen. The firing temperature is 1325° C. and the firing period is two hours. Thereafter, the fired material is crushed to finely divided status. Refiring under the same conditions is desirable in some instances.

In preparing the calcium silicate modification of the phosphor, an equivalent molar amount of calcium carbonate is substituted for the magnesium carbonate in the foregoing example. In addition, calcium carbonate and magnesium carbonate can be mixed in any proportions when preparing the phosphor, maintaining the molar ratio of carbonate to silica at 2:1. In preparing the modification of the phosphor which is activated only by terbium, the lithium carbonate is omitted from the raw mix in foregoing example.

The phosphor embodiment which is activated only by terbium has a bright green emission, with the spectrum constituting a series of lines. The addition of lithium activator shifts the color somewhat toward the longer wavelengths and also increases the brightness of the phosphor.

The foregoing phosphor can be modified by adding 0.02 mole of manganous carbonate to the raw mix as detailed in the foregoing example. The resulting phosphor has a continuous band of emission in the longer wavelength regions of the visible spectrum, which has the effect of shifting the overall emisison of the phosphor toward the longer wavelengths. The foregoing phosphor embodiments all have an excellent output, both at room temperature and at elevated temperatures as high as 380° C.

The terbium activator can be used in a wide range of concentrations and the gram-atom ratio of terbium to silicon in the phosphor is from 0.01:1 to 0.3:1. The preferred gram-atom ratio of terbium to silicon in the phosphor is from 0.02:1 to 0.2:1. In case lithium activator is used, the gram-atom ratio of lithium to silicon in the phosphor can vary from 0.004:1 to 0.3:1, and preferably this ratio is from 0.01:1 to 0.18:1. In the case a manganese activator is used, the gram-atom ratio of manganese to silicon in the phosphor can vary from 0.002:1 to 0.06:1, and preferably is from 0.005:1 to 0.04:1.

Other rare-earth metal activators can supplement the terbium activator in the foregoing example. These other rare-earth activators will shift the emission toward the longer visible wavelengths. All of these modified phosphor embodiments have good temperature-dependence characteristics. As an example, samarium or dysprosium rare-earth activator can be used in total amount up to thirty-five gram-atom percent of the terbium activator which is present. Such other rare-earth activators can be added as the oxide to the raw mix when preparing the phosphor. The total rare-earth activator concentration should not exceed that as specified hereinbefore for terbium.

A portion of the terbium activator can be replaced by other activator materials, such as lead. This decreases the brightness of the phosphor somewhat, but represents a savings in cost of the rare-earth metal. Other metals such as thallium, bismuth or indium can be used to replace a part of the terbium activator, with some resulting decrease in output for the phosphor, but with a cost savings.

The phosphors of the present invention can also be prepared by firing in an air atmosphere, although the nitrogen or nitrogen plus hydrogen firing atmosphere is preferred. When coating the phosphor onto lamp bulbs, it is desirable to limit the lehring temperatures which are normally required to volatilize organic binder materials. The phosphor of the present invention can readily be coated onto a lamp bulb by means of an electrostatic coating process, thereby precluding the necessity of using an organic binder material. With such a coating process, the maximum temperature to which the phosphor is exposed during lamp fabrication need not exceed about 450° C.

It will be recognized that the objects of the invention have been achieved by providing novel phosphor material which can be modified to have a wide range of emission colors, including the longer wavelength regions of the visible spectrum. In addition, the phosphor material has good temperature-dependence characteristics which makes it particularly adapted for use with high-pressure, mercury-vapor lamps.

While best examples of the invention have been illustrated and described hereinbefore, it is to be particularly understood that the invention is not limited thereto or thereby.

I claim as my invention:

1. A silicate phosphor having the general formulation $X_2SiO_4:Z$, wherein X is at least one matrix constituent material of the group consisting of calcium and magnesium, and Z principally comprises activator material of the group consisting of terbium, terbium plus lithium and terbium plus lithium plus manganese.

2. A silicate phosphor having the general formulation $X_2SiO_4:Z$, wherein X is at least one matrix constituent material of the group consisting of calcium and magnesium; and Z principally comprises activator material of the group consisting of terbium, terbium plus lithium and terbium plus lithium plus manganese; the gram-atom ratio of terbium activator to silicon in said phosphor being from 0.01:1 to 0.3:1, the gram-atom ratio of lithium to silicon in said phosphor being from 0.004:1 to 0.3:1, and the gram-atom ratio of manganese to silicon in said phosphor being from 0.002:1 to 0.06:1.

3. A silicate phosphor having the general formulation $X_2SiO_4:Z$, wherein X is at least one matrix constituent material of the group consisting of calcium and magnesium; and Z is one activator material of the group consisting of terbium, terbium plus lithium and terbium plus lithium plus manganese; the gram-atom ratio of terbium to silicon in said phosphor being from 0.02:1 to 0.2:1, the gram-atom ratio of lithium to silicon in said phosphor being from 0.01:1 to 0.18:1, and the gram-atom ratio of manganese to silicon in said phosphor being from 0.005:1 to 0.04:1.

4. A silicate phosphor having the general formulation $X_2SiO_4:Z$, wherein X is at least one matrix constituent material of the group consisting of calcium and magnesium; and Z is one activator material of the group consisting of terbium, terbium plus lithium and terbium plus lithium plus manganese; the gram-atom ratio of terbium to silicon in said phosphor being about 0.12:1, the gram-atom ratio of lithium to silicon in said phosphor being about 0.14:1, and the gram-atom ratio of manganese to silicon in said phosphor being about 0.02:1.

5. A silicate phosphor having a matrix consisting essentially of $Mg_2SiO_4$ and activated by one material of the group consisting of terbium, terbium plus lithium and terbium plus lithium plus manganese, the gram-atom ratio of terbium to silicon in said phosphor being from 0.01:1 to 0.3:1, the gram-atom ratio of lithium to silicon in said phosphor being from 0.004:1 to 0.3:1, and the gram-atom ratio of manganese to silicon in said phosphor being from 0.002:1 to 0.06:1.

6. A silicate phosphor having a matrix consisting essentially of $Mg_2SiO_4$ and activated by one material of the group consisting of terbium, terbium plus lithium, and terbium plus lithium plus manganese, the gram-atom ratio of terbium to silicon in said phosphor being from 0.02:1 to 0.2:1, the gram-atom ratio of lithium to silicon in said phosphor being from 0.01:1 to 0.18:1, and the gram-atom ratio of manganese to silicon in said phosphor being from 0.005:1 to 0.04:1.

7. A silicate phosphor having the general matrix formulation $Mg_2SiO_4$ and activated by one material of the group consisting of terbium, terbium plus lithium, and terbium plus lithium plus manganese, the gram-atom ratio of terbium to silicon in said phosphor being about 0.12:1, the gram-atom ratio of lithium to silicon in said phosphor being about 0.14:1, and the gram-atom ratio of manganese to silicon in said phosphor being about 0.02:1.

8. A silicate phosphor having the general matrix formulation $Mg_2SiO_4$ and activated by terbium and lithium, the gram-atom ratio of terbium to silicon in said phosphor being from 0.02:1 to 0.2:1, and the gram-atom ratio of lithium to silicon in said phosphor being from 0.01:1 to 0.18:1.

9. A silicate phosphor having a matrix consisting essentially of $Ca_2SiO_4$ and activated by one material of the group consisting of terbium, terbium plus lithium, and terbium plus lithium plus manganese, the gram-atom ratio of terbium to silicon in said phosphor being from 0.02:1 to 0.2:1, the gram-atom ratio of lithium to silicon in said phosphor being from 0.01:1 to 0.18:1, and the gram-atom ratio of manganese to silicon in said phosphor being from 0.005:1 to 0.04:1.

10. A silicate phosphor having the general matrix formulation $Ca_2SiO_4$ and activated by one material of the group consisting of terbium, terbium plus lithium, and terbium plus lithium plus manganese, the gram-atom ratio of terbium to silicon in said phosphor being about 0.12:1, the gram-atom ratio of lithium to silicon in said phosphor being about 0.14:1, and the gram-atom ratio of manganese to silicon in said phosphor being about 0.02:1.

References Cited by the Examiner

UNITED STATES PATENTS 2,297,108  9/1942  McKeag et al. _____ 252—301.4

FOREIGN PATENTS 572,771  10/1945  Great Britain.

OTHER REFERENCES

Korger, "Some Aspects of the Luminescence of Solids," Elsevier Pub. Co., New York, 1948, pp. 291 and 293.

TOBIAS E. LEVOW, *Primary Examiner.*

R. D. EDMONDS, *Assistant Examiner.*